Nov. 17, 1964 J. F. HERUBEL 3,156,951
COMPOSITE FALLER BAR

Filed May 10, 1962 2 Sheets-Sheet 1

Nov. 17, 1964 J. F. HERUBEL 3,156,951
COMPOSITE FALLER BAR
Filed May 10, 1962 2 Sheets-Sheet 2
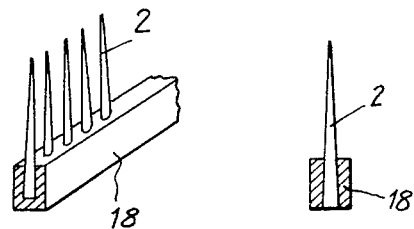
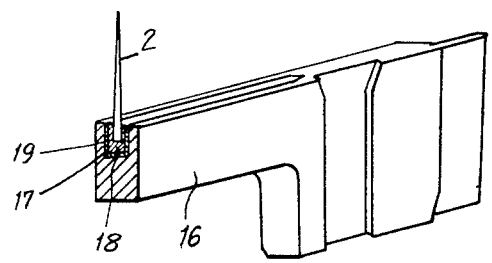

United States Patent Office 3,156,951
Patented Nov. 17, 1964

3,156,951
COMPOSITE FALLER BAR
Jean Frederic Herubel, Guebwiller, Haut-Rhin, France, assignor to N. Schlumberger & Cie, Guebwiller, Haut-Rhin, France
Filed May 10, 1962, Ser. No. 193,782
Claims priority, application France, May 19, 1961, 862,291
8 Claims. (Cl. 19—129)

The present invention relates to composite faller bars which are especially although not exclusively intended to be employed in the machines known as intersecting machines or gilling machines employed for drafting sliver of fiber stock, especially in machines employed preparatory to the combing process and to the spinning process of the type applied to worsted fabrics.

It is known that composite faller bars comprise a rigid body, while the pins are fixed in a holder or comb-bar which is inserted in the said body in which the said strip is held by welding, crimping-over or in any other appropriate manner.

It is an object of the present invention to provide a faller bar of the aforementioned type adapted for accommodating comb-bars which are fitted with pins and which are cheap to manufacture, which can both be easily fixed in the faller-bar body and readily removed therefrom without the need for costly equipment and skilled labor, this being accomplished as a result of a reversible process of installation involving neither any damage or modification of the faller bar components.

In more specific terms, it is an object of the invention to provide a method of assembly of a composite faller bar which consists in first assembling the pins together as a unit by means of a first application of solder, then in fixing the unit thus formed inside the faller-bar body by means of a second application of solder, the solder in the two applications having different characteristics such that, on the one hand, the assembly of the said unit inside the faller-bar body by means of the second application of solder neither impairs the cohesion nor the strength of the said unit such that the said unit can later be removed from the faller-bar body by subjecting the second application of solder to a physical and/or chemical action without thereby causing damage to the components of the said faller bar.

In accordance with a characteristic feature of the invention, the applications of solder have melting points which, on the one hand, are different from each other and, on the other hand, are lower than the temperature of drawing, softening or annealing of the pins.

In accordance with a further characteristic feature of the invention, a mass which is constituted by the first application of solder is moulded from a casting over the bases of the assembled pins, the unit thus formed being then fixed inside the faller-bar body by means of the second application of solder.

In accordance with yet a further characteristic feature of the invention, the pins are first of all assembled by means of the first application of solder so as to be joined together on the one hand while being joined to a holder on the other hand, the unit thus formed being then fixed inside the faller-bar body by means of the second application of solder.

The invention is additionally directed to composite faller bars which are assembled by the method as hereinabove specified.

The present invention also has for an object to provide a faller-bar of the composite type in which the holder or comb-bar to which the pins are joined as a result of the first application of solder is shaped by folding.

In accordance with yet another characteristic feature of the invention, the comb-bar is shaped in such manner that it has two portions at right angles to the axis of the pins, at least one of the said portions comprising an opening for the purpose of positioning a pin which opening is preferably formed by punching.

In accordance with again another characteristic feature of the invention, the folded member which forms the comb-bar can be internally grooved, for example by milling prior to folding, with a pitch corresponding to the spacing of the assembled pins.

In accordance with still a further characteristic feature of the invention, the folded member which forms the comb-bar can be inset in the spaces between the pins.

Further characteristic features and advantages of the invention will be brought out from the description which follows below, reference being made to the accompanying drawings, in which:

FIG. 7 shows in perspective an alternative embodiment in which the comb-bar is formed directly in the mass of the first application of solder.

FIG. 7a is a cross-sectional view of a variation of the embodiment of FIG. 7.

FIG. 8 is a perspective view, partly in cross-section, of a faller bar utilizing the comb-bar of FIG. 7.

As has been explained above, the faller bar is of the type which is composed of a comb-bar fitted with pins, and a body into which the said comb-bar is inserted.

Figure 1:
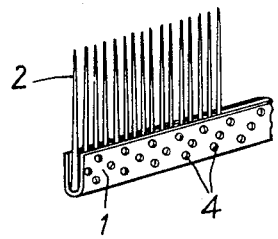
FIG. 1 is a perspective view of a first embodiment of the inserted comb-bar of a composite faller bar in accordance with the invention, showing the pins prior to their fixation in the comb-bar by means of the first application of solder.
Figure 2:
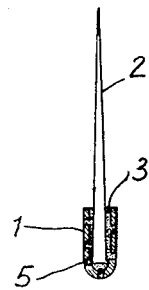
FIG. 2 is a transverse cross-section of the comb-bar of FIG. 1 in the finished state and fitted with pins.

In the embodiment which is illustrated in FIGS. 1 and 2, the comb-bar is formed by a U-shaped folded member 1 constituted by sheet metal, wire cloth or the like. The U-shaped member 1 defines a groove which is intended to receive the pins 2 which are fixed inside the said groove by means of an appropriate filling of solder 3, as shown in FIG. 2. The solder employed for this purpose is, for example, that which is sold under the denomination UTP.59, or alternatively Castollin type 197 which has a melting point of 300°. In order to improve the rigidity of the pins inside the member 1, the arms of the U are pierced or punched with holes 4 into which the solder 3 penetrates in such manner as to form lateral projections 5 which have the effect of anchoring the combined assembly constituted by the solder 3 and the pins 2, both in the axial direction of the pins as well as in the axial direction of the comb-bar.

Figure 3:
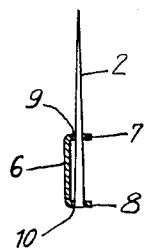
FIGS. 3 and 4 show two alternative forms of the member which forms the comb-bar.

In the embodiment of FIG. 3, the comb-bar is constituted by a member 6 which is folded into the shape of a C and the central portion of which is substantially parallel to the pins 2. The end portions 7 and 8 are folded back at right angles with respect to the pins 2 and are provided with positioning holes 9 and 10 respectively which are formed preferably by punching. The fixation of the pins is effected as in the case of FIGS. 1 and 2, by means of a solder filling (which is not shown in the figure).

Figure 4:
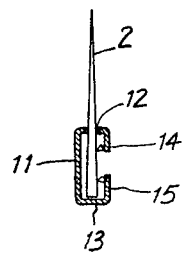

In FIG. 4, the comb-bar is constituted by a member 11, the ends of which are folded back twice at right angles, that is to say once at right angles to the pins 2, at 12 and 13 respectively, and then parallel to the pins in a direction opposite to each other, at 14 and 15 respectively, so as to be finally folded inwards facing one another. A filling of solder (which has not been illustrated in the figure) could further strengthen the fixation of the pins. As an alternative form, the wall 13 could be provided with punched holes intended to receive the pins.

The faller-bar body is constituted by a bar 16 in which is formed a groove 17. Inside this groove is mounted the comb-bar which is fitted with pins and made in accordance with one of the embodiments of FIGS. 1 to 4.

Figure 5:
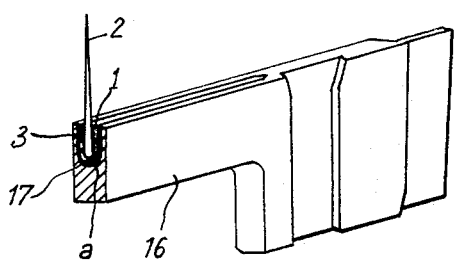
FIG. 5 is a perspective view partly in cross-section, of a faller bar in accordance with the invention and constituted in part by the comb-bar which is illustrated in FIGS. 1 and 2.
Figure 6:
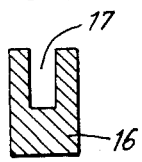
FIG. 6 is a transverse cross-section of the faller bar body alone.

FIG. 5 shows the comb-bar of FIGS. 1 and 2 mounted inside the body 16. In accordance with a characteristic feature of the invention, the comb-bar is secured by means of a filling of solder which is shown diagrammatically at $a$ and the melting point of which is lower than the melting point of the solder 3 which serves to fix the pins 2 inside the member 1 of the comb-bar assembly.

In order to secure in this manner the comb-bar inside the faller-bar body, the procedure is as follows:

The faller-bar body 16 is supported in a heating vise after having tinned the walls of the groove 17. A bead of solder is then deposited at the bottom of the groove 17. This solder can be constituted, for example, by a conventional tin and lead solder having a melting point of 200°, or alternatively by a solder sold under the trademark Castollin 157. After melting of the said bead of solder, the comb-bar fitted with pins is inserted in the groove 17 after having been previously heated and tinned in a bath which also contains the same solder and which is preferably associated with the heating vise so that the said solder is maintained in a liquid state by the said heating vise. The assembled unit is then withdrawn for cooling, whereafter the faller bar is ready for use.

As has already been explained above, the bead of solder which is placed in the bottom of the groove 17 has a melting point which is lower than that of the solder 3 which holds the pins inside the comb-bar. The vise is, of course, so arranged that the temperature thereof does not approach the melting point of the solder 3 in order not to either impair the fixation of the pins inside the comb-bar or affect the temper of the said pins.

FIG. 7 shows a simplified comb-bar which is constituted directly by a mass 18 of solder of the same properties as solder 3. The mass 18 of solder is moulded over the bases of the assembled pins 2, with the result that the holder of the embodiments of FIGS. 1 to 4 to which the pins are secured are eliminated.

As an alternative form, the base of the set of pins could be brought flush with the mass 18 of solder as illustrated in FIG. 7a.

FIG. 8 shows a faller bar which is assembled with the comb-bar of FIG. 7. As in the previous embodiments, the comb-bar 18 is fixed inside the groove 17 of the faller-bar body 16 by means of the second filling of solder which is shown diagrammatically at 19.

It follows from the foregoing that the repair of a faller bar in accordance with the invention, in the event that one of the pins should break, can be effected in a minimum time and at a reasonable cost, by virtue of the fact that the construction of the faller bar is carried out as a result of reversible processes (melting and solidifying of a filling of solder), so that consequently the comb-bar can be readily removed from the faller-bar body merely by heating the faller bar to the melting temperature of that filling of solder which secures the comb-bar inside the faller-bar body, while this operation does not cause either any damage or any modification to the components of the faller bar which would entail the need for additional operations prior to the reassembly of the comb-bar.

It is understood that the forms of embodiment which have been described in the foregoing and illustrated in the accompanying drawings are given solely by way of example and not in any sense by way of limitation and that it is possible to modify in any appropriate manner the shape, the nature, the arrangement and system of assembly of the constituent elements without departing either from the scope or the spirit of the present invention as defined in the following claims.

What is claimed is:

1. A method of assembling a composite faller bar comprising forming a comb bar by soldering a plurality of pins to a support member using solder having a determinable melting point which is below the annealing temperature of the pins and assembling said comb bar in a groove therefor in a faller bar body by subsequently soldering the comb bar in said groove to said faller bar body using solder having a melting point which is lower than the melting point of the solder joining the pins to the support member whereby the latter soldering operation can be carried out without affecting the joint between the pins and the support member, said pins being removable from said support member for replacement by first heating the faller bar body and the comb bar to a temperature above the melting point of the lastly applied solder but below the melting point of the solder joining the pins to the support member to permit removal of the comb bar from the faller bar body and then removing the desired pin from the comb bar by heating above the melting point the solder securing the pins to the support member.

2. A method as claimed in claim 1 wherein the solder which joins the comb bar to the faller bar body is initially present in the groove in the faller bar body in a melted condition, the comb bar being inserted in the groove and causing the melted solder to substantially form an intermediate layer between the comb bar and the faller bar body to effect a uniform joint therebetween.

3. A method as claimed in claim 1 comprising forming said support member of the first mentioned solder in the shape of the groove in the faller bar body.

4. A faller bar comprising a support member, a plurality of pins having a determinable annealing temperature, meltable means securing the pins to the support member to constitute a comb bar, said meltable means having a melting temperature above which the means is in liquid state and below which the means is in solid state, said means passing between respective states as said temperature is crossed irrespective of direction, said melting temperature being below the annealing temperature of the pins and at which melting temperature the meltable means is liquid and the pins can be separated from the support, a faller bar body having a groove, said comb bar being supported in said groove and an intermediate layer of second meltable means in the groove between said comb bar and the faller bar body securing the comb bar to the latter, said second meltable means having a melting temperature which is lower than that of the first said meltable means.

5. A faller bar comprising a support member, a plurality of pins having a determinable annealing temperature and solder securing the pins to the support member to constitute a comb bar, the solder having a melting temperature which is below the annealing temperature of the pins, a faller bar body having a groove, said comb bar being supported in said groove and an intermediate layer of second solder in the groove between said comb bar and the faller bar body securing the comb bar to the latter, said second solder having a melting temperature which is less than that of the first mentioned solder.

6. A faller bar comprising a support member, a plurality of pins having a determinable annealing temperature and solder securing the pins to the support member to constitute a comb-bar, the solder having a melting temperature which is below the annealing temperature of the pins, a faller bar body having a groove, said comb-bar being supported in said groove and an intermediate layer of second solder in the groove between said comb-bar and the faller bar body securing the comb-bar to the latter, said second solder having a melting temperature which is less than that of the first mentioned solder, said support member being U-shaped, the pins extending beyond the support member, said U-shaped member having a plurality of perforations, the first mentioned solder being contained within said U-shaped member and filling said perforations to securely fasten the pins to the U-shaped member.

7. A faller bar comprising a support member, a plurality of pins having a determinable annealing temperature and solder securing the pins to the support member to constitute a comb-bar, the solder having a melting temperature which is below the annealing temperature of the pins, a faller bar body having a groove, said combbar being supported in said groove and an intermediate layer of second solder in the groove between said combbar and the faller bar body securing the comb-bar to the latter, said second solder having a melting temperature which is less than that of the first mentioned solder, said support member including a central portion and folded portions extending from the central portion, said folded portions having aligned openings accommodating said pins therein.

8. A faller bar comprising a plurality of pins having a determinable annealing temperature, a mass of solder having a melting temperature below the annealing temperature of the pins, said pins being partially embedded in the solder in spaced relation to constitute a comb-bar assembly, a faller bar body having a groove of a particular shape, said mass of solder having an outer contour corresponding to the shape of the groove, said mass of solder being accommodated in said groove and an intermediate layer of solder in the groove between the solder of the comb-bar and the faller bar body securing the comb-bar to the faller bar body, said solder of the intermediate layer having a melting temperature which is less than that of the solder of the comb-bar.

References Cited in the file of this patent
UNITED STATES PATENTS

| | | |
|---|---|---|
| 899,280 | Young | Sept. 22, 1908 |
| 1,654,105 | Uzmann | Dec. 27, 1927 |
| 2,860,381 | Spisak | Nov. 18, 1958 |
| 3,057,021 | Hill | Oct. 9, 1962 |

FOREIGN PATENTS

| | | |
|---|---|---|
| 1,067,939 | France | Feb. 3, 1954 |
| 891,668 | Germany | Oct. 1, 1953 |